US006466393B1

(12) United States Patent
Mitani

(10) Patent No.: US 6,466,393 B1
(45) Date of Patent: Oct. 15, 2002

(54) DRIVING DEVICE AND SERVO METHOD WITH FIXED-SPEED MOVEMENT

(75) Inventor: Akira Mitani, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/415,511

(22) Filed: Oct. 8, 1999

(30) Foreign Application Priority Data

Oct. 9, 1998 (JP) ............................................ 10-288420

(51) Int. Cl.⁷ ................................................ G11B 21/02
(52) U.S. Cl. ...................................... 360/75; 360/77.03
(58) Field of Search ............................. 360/75, 77.03, 360/69, 78.05, 78.06, 78.11; 369/43, 32

(56) References Cited

U.S. PATENT DOCUMENTS

| | | | |
|---|---|---|---|
| 4,866,687 A | * | 9/1989 | Kasai et al. ............... 369/43 X |
| 5,091,808 A | * | 2/1992 | Nigam ................. 360/77.03 X |
| 5,148,420 A | | 9/1992 | Yamamuro |
| 5,406,536 A | | 4/1995 | Doi |
| 5,426,625 A | | 6/1995 | Bui et al. |
| 6,034,838 A | * | 3/2000 | Touji et al. ........... 360/77.03 X |
| 6,304,404 B1 | * | 10/2001 | Mitani ................. 360/77.03 X |

FOREIGN PATENT DOCUMENTS

| | | |
|---|---|---|
| EP | 0 277 799 | 8/1988 |
| EP | 0 364 085 | 4/1990 |
| EP | 0 372 953 | 6/1990 |
| EP | 0 800 166 | 10/1997 |

* cited by examiner

Primary Examiner—David Hudspeth
Assistant Examiner—K. Wong
(74) Attorney, Agent, or Firm—Frommer Lawrence & Haug LLP; William S. Frommer; Glenn F. Savit

(57) ABSTRACT

A driving device for performing a recording and/or reproducing operation for a recording medium, such as a flexible disc, and a fixed speed movement servo method carried out on such driving device. A head for recording and/or reproducing the information for a recording medium is run at a fixed speed using initial servo parameters as certain fixed values to calculate optimum servo parameters. Using the calculated servo parameters, constant speed servo is executed to realize the head running at a fixed speed. This achieves constant speed movement at a certain speed within a pre-set speed range regardless of individual characteristics or occasional posture of the recording/reproducing apparatus.

13 Claims, 13 Drawing Sheets

FIG.2A  FIG.2B

DRIVING DEVICE AND SERVO METHOD WITH FIXED-SPEED MOVEMENT

BACKGROUND OF THE INVENTION

1. Field of the Invention

This invention relates to a driving device for performing a recording and/or reproducing operation for a recording medium, such as a flexible disc, and a fixed speed movement servo method carried out on such driving device.

2. Description of the Related Art

As a recording medium, such as a flexible disc, such a one having the recording capacity at the formatting time of approximately 1.44 Mbytes, referred to below as a lower-order recording medium, has so far been used extensively. Among the recording/reproducing apparatus for recording and/or reproducing information signals for this lower order recording medium, there is such a one in which the recording medium is run in rotation at an rpm of approximately 300 to 6000 to effect recording/reproduction. This recording/ reproducing apparatus is referred to below as a recording/ reproducing of the lower order specifications.

In the above-described recording/reproducing apparatus of the lower order specifications, the magnetic head is moved to a desired data track by movement means driven by a stepping motor. Specifically, the magnetic head is moved stepwise in the direction along the radius of the recording medium by a stepping motor for locating the magnetic head on each data track and information signals are recorded/ reproduced for the data track to which has been moved the magnetic head.

In the recording/reproducing apparatus of the lower order specifications, the position of the data track, in which is positioned the magnetic head, is detected on the basis of the number of pulses supplied to the stepping motor, or on the angular rotation.

Recently, such a recording medium having the recording density higher than that of the above-described lower order recording medium, as a result of reducing the track width, with the recording capacity at the formatting time being 150 to 650 Mbytes, referred to below as the upper order recording medium, has been proposed. Among the recording/ reproducing apparatus for recording and/or reproducing information signals for the upper order recording medium, there is a recording/reproducing apparatus of the specifications in which a recording medium is run in rotation at an rpm of approximately 1200 to 3600 to improve the recording density or the data transfer rate. This apparatus is referred to below as a recording/reproducing apparatus of the upper order specifications.

In the recording medium of the upper order specifications, there is stored the position information specifying the position of each data track. In the recording medium of the upper order specifications, this position information is detected in order to locate the magnetic head on each data track.

Also, in this type of the recording/reproducing apparatus, a voice coil motor, which is a linear motor, is used to cause continuous movement of the magnetic head along the radius of the recording medium. The position information stored in the recording/reproducing apparatus of the upper order specifications is detected to locate the magnetic head on the target data track by the voice coil motor to perform recording/reproduction.

This voice coil motor is superior to the above-mentioned stepping motor as to saving in the driving power and fast feed of the magnetic head.

However, certain recording mediums, such as the above-mentioned lower order recording medium, are not provided with the information concerning the data track. In this case, the current position of the magnetic head cannot be confirmed even if the magnetic head is fed across tracks by the voice coil motor, such that the magnetic head cannot be moved to the desired data track.

Recently, such a recording/reproducing apparatus has been developed which is able to record/reproduce information signals of both the lower order and upper order recording mediums. This type of the apparatus is occasionally provided with a magnetic head driving unit by a voice coil motor. However, there is raised a problem in this case that, if both the upper order recording medium and the lower order recording medium need to be able to perform recording/reproduction of information signals, it is not possible to feed the magnetic head to a desired data track of the lower order recording medium.

Thus, it has been contemplated to generate the information indicating the position of the associated head in association with the data track of the recording medium at the outset if a recording medium not having the data track position information stored therein is loaded on the recording/reproducing apparatus.

For example, a magnetic head is previously run over the entire data track area and the position information is prepared in association with each data track. The position information so prepared is stored in a memory. The position information, that is the information associated with each data track, stored in the memory, may then be used to perform appropriate feed control of the magnetic head.

As a mode specified technique, it has also been proposed as a prior-art technique to generate sinusoidal signals (scale signal) which complete one period every data track as the magnetic head is moved and to store the top and bottom values of each period of the signal in association with each data track.

Meanwhile, if, during previous scanning of the magnetic head for generating the position information, the magnetic head movement is not performed appropriately, it is not possible to generate the appropriate position information. It is therefore required to cause movement of the magnetic head at a constant speed within a pre-set speed range during scanning.

However, due to fluctuations in characteristics from one recording/reproducing apparatus to another or in occasional position statuses of the apparatus, if the magnetic head and hence the voice coil motor are moved using predetermined parameters by way of the fixed-speed movement servo, the magnetic head is not necessarily run in rotation at a speed within a proper speed range, as a result of which the proper position information occasionally cannot be detected. In such case, position feed to a specified data track cannot be controlled appropriately.

SUMMARY OF THE INVENTION

It is therefore an object of the present invention to provide a driving device for performing a recording and/or reproducing operation for a recording medium in which fixed speed rotation within a predetermined speed range can be positively achieved so that the information associated with each data track of the recording medium can be acquired correctly.

In one aspect, the present invention provides a driving device including head means for recording/reproducing data for a plurality of data tracks of a recording medium, head driving means for causing movement of the head means in a direction perpendicular to the data tracks on the recording medium, scale signal generating means for generating a scale signal whose period corresponds to a data track, storage means for storing top and bottom values in each period of the scale signal associated with each data track as data used for movement control of the head means, servo parameter calculating means for servo controlling the head driving means using initial servo parameters to cause movement of the head means at a constant speed and for calculating servo parameters for fixed speed movement from top and bottom values of the scale signal measured at the time of constant speed movement of the head means, and movement control data storage control means for servo controlling the head driving means using the servo parameters calculated by the servo parameter calculating means for causing movement of the head means at a fixed speed. The movement control data storage control means measures the top and bottom values in each period of the scale signal associated with each data track to cause the measured top and bottom values to be stored in the storage means.

In another aspect, the present invention provides a drive device including first head means for recording and/or reproducing data for data track of a first disc-shaped recording medium, second head means for recording and/or reproducing data for data tracks of a second disc-shaped recording medium higher in the recording capacity than the first disc-shaped recording medium, head driving means for causing movement of the first and second head means in a direction perpendicular to a plurality of the data tracks of the first and second disc-shaped recording mediums, respectively, recording medium holding means on which the first and second disc-shaped recording mediums are loaded selectively, discriminating means for discriminating the type of the disc-shaped recording mediums loaded on the recording medium holding means, detection means for detecting the state of movement of a head responsive to movement of the head means, and control means for controlling the head driving means so that, if the discriminating finds that the first disc-shaped recording medium has been loaded, the head means is moved based on a detection output of the detection means, and so that, if the discriminating finds that the second disc-shaped recording medium has been loaded, the head means is moved based on the servo information recorded on the second disc-shaped recording medium.

In yet another aspect, the present invention provides a method for fixed speed movement servo for causing fixed speed movement of head means, adapted for recording/reproducing data for a plurality of data tracks of a recording medium, in a direction perpendicular to the data tracks of the recording medium, by head driving means. The method includes an initial movement step for servo controlling the head driving means using initial servo parameters for causing movement of the head means at a fixed speed, a measurement step for monitoring a scale signal, generated responsive to movement of the head means, with each data track as one period, during movement of the head means in accordance with the initial movement step, for measuring top and bottom values of the scale signal, a calculating step for calculating servo parameters for fixed speed movement, using the top and bottom values as measured in the measurement step and a fixed speed movement step for servo controlling the head driving means, using the servo parameters as calculated by the calculating step, to cause movement of the head means at a fixed speed.

According to the present invention, a head for recording and/or reproducing the information for a recording medium is run at a fixed speed using initial servo parameters as certain fixed values to calculate optimum servo parameters. Using the calculated servo parameters, constant speed servo is executed to realize the head running at a fixed speed. This achieves constant speed movement at a certain speed within a pre-set speed range regardless of individual characteristics or occasional posture of the recording/reproducing apparatus. That is, a servo method of high reliability is realized as the fixed speed movement servo method, whilst optimum control becomes possible in case constant speed movement is required in the drive device.

During such fixed speed movement of the head means, top and bottom values of the scale signal are detected to provide the optimum information associated with each data track. This assures subsequent feed operation relative to the data tracks and tracking control in a reliable manner.

The constant speed movement of the head means is executed by controlling the head driving means by a value corresponding to the difference between the reference speed and the current speed multiplied by a predetermined gain. At least the values of the gain and the reference speed are calculated by servo parameter calculating means. The servo parameters are calculated using the amplitude level of the scale signal as calculated from the top and bottom values to realize stable constant speed movement servo.

DESCRIPTION OF THE PREFERRED EMBODIMENTS

Figure 1:
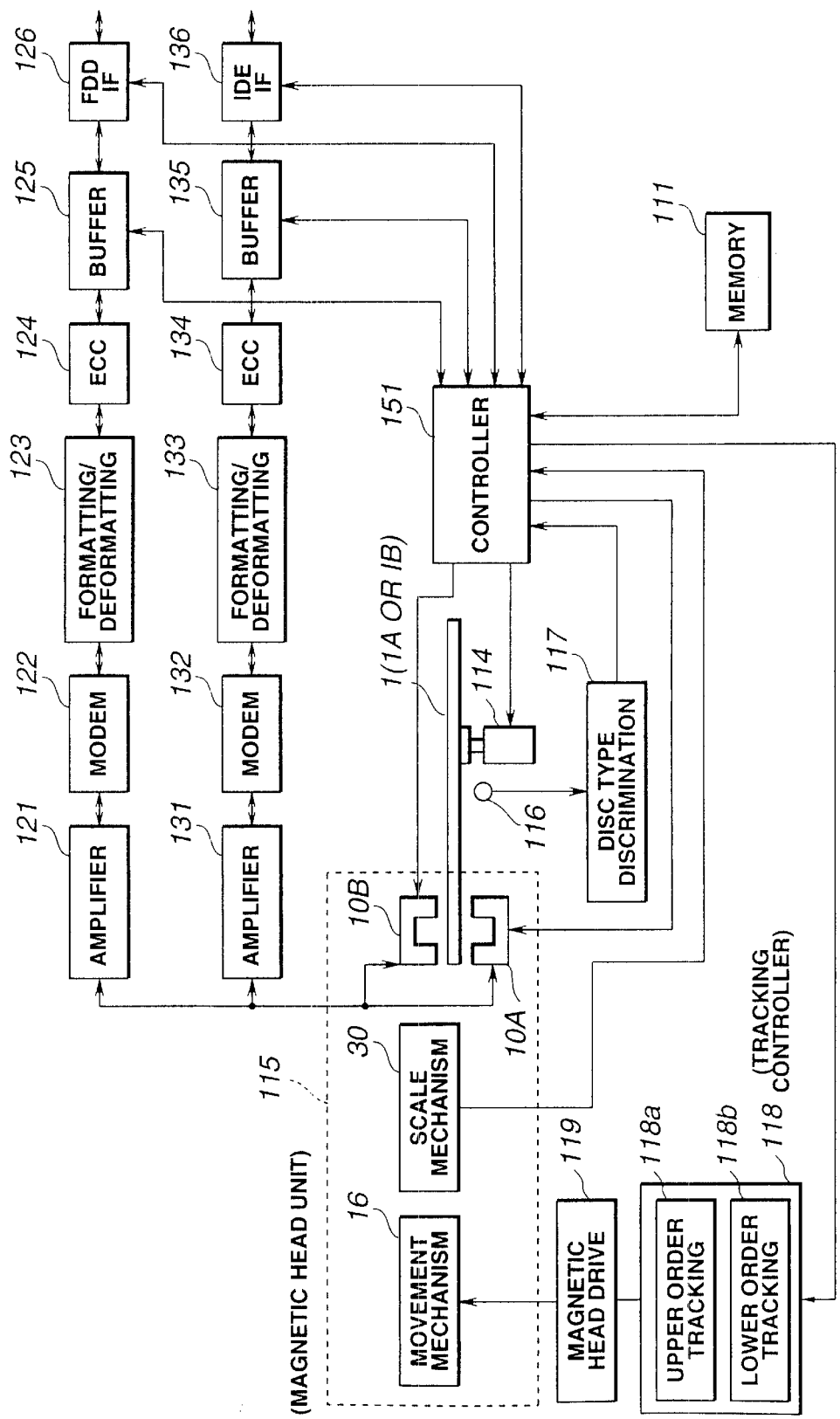
FIG. 1 is a block diagram of a recording/reproducing apparatus embodying the present invention.

Referring to the drawings, a disc drive device for performing a recording/reproducing operation for a flexible disc and a fixed speed movement servo system used in the disc drive device, according to preferred embodiments of the present invention, will be explained in the following sequence:

1. structure of a disc drive device;
2. structure of a magnetic head unit;
3. scale mechanism and scale signal; and
4. fixed speed servo and scale information acquiring processing on loading a lower order disc;

it being noted that the fixed speed movement servo is sometimes simply referred to as a "fixed speed servo".

1. Structure of a Disc Drive Device

FIG. 1 shows an illustrative structure of a disc drive device embodying the present invention.

Figure 2:
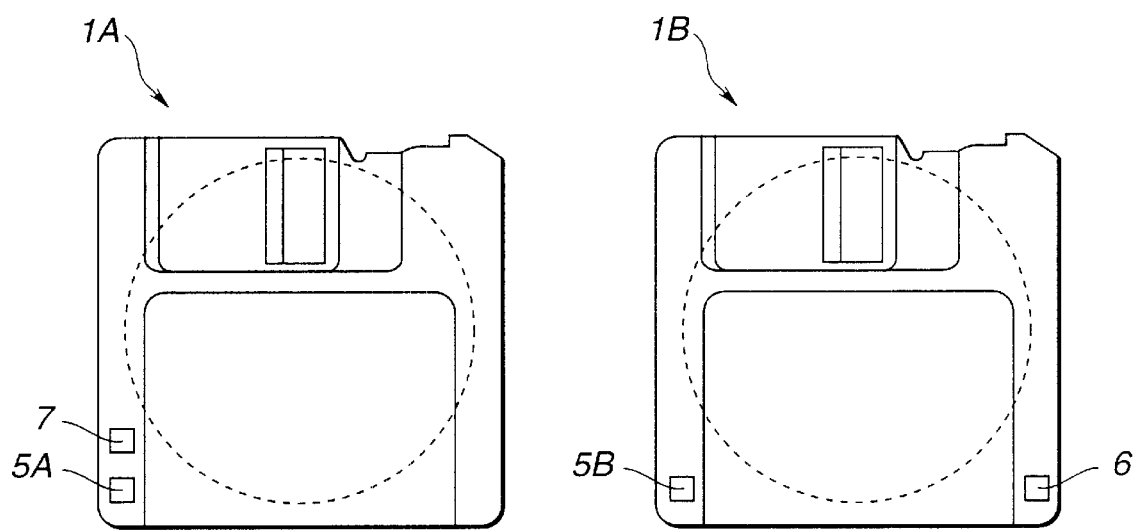
FIG. 2 schematically shows a flexible disc cassette employed in a preferred embodiment.

As the flexible disc (floppy disc) 1, which is a recording medium usable in this disc drive device, at least two sorts of discs 1A and 1B, shown in FIGS. 2a, 2b, are presupposed.

FIG. 2b shows a flexible disc having a pre-set track pitch and a recording capacity at the formatting time of approximately 1.44 Mbytes. This disc is referred to below as a lower-order disc 1B. FIG. 2a shows a flexible disc having a track pitch narrower than a pre-set track pitch of the lower-order disc 1B to raise the recording density in comparison with the lower-order disc 1B, with the recording capacity at the formatting time being 150 to 650 Mbytes. This disc is referred to below as an upper order disc 1A.

As shown in these figures, the discs 1A, 1B are housed in cartridges of substantially the same size and shape.

In FIGS. 2A and 2B, a write protector 15 indicates a writing possible state and a writing inhibiting state if its hole is closed or opened, respectively. An HD hole 6 indicates a so-called 2HD disc having a recording capacity of approximately 2 Mbyte in an unformatted state, and other discs, if the hole is opened or closed, respectively.

Also, a discriminating hole 17, provided at a pre-set location, other than those for the write protector 15 or the HD hole 16 in the upper order disc 1A, indicates an upper order disc of high recording density. As discriminating means for the upper order disc 1A, a light reflecting member may be provided in place of the discriminating hole 7. Alternatively, other discriminating means, such as presence or absence of cutouts, difference in reflectance, etc, may also be used. If plural sorts of the upper order disc 1A are prescribed by, for example, difference in recording capacities, plural different modes may be discriminated based on different combinations of plural holes.

Although not shown in detail, plural data tracks are formed concentrically so that the data tracks run substantially parallel to one another. Although the address information is added in association with the respective data tracks, there is no such address information added to the lower-order disc 1B.

The disc drive device shown in FIG. 1 is able to discriminate the upper order disc 1A and the lower-order disc 1B from each other to effect data recording/reproduction interchangeably.

In the following description, if the disc may be any of the lower-order disc 1B or the upper order disc 1A, it will be referred to simply as a magnetic disc 1.

In the disc drive device of the preferred embodiment, shown in FIG. 1, a magnetic head unit 115 for magnetically recording/reproducing data for the magnetic disc 1 is provided with mutually facing magnetic head elements 10A, 10B. In these magnetic head elements 10A, 10B are assembled head chips for the upper order disc 1A and those for the lower-order disc 1B.

In the present disc drive device, the magnetic head unit 115 for recording/reproducing data for the metal magnetic disc 1 is provided with a movement mechanism 16 for causing movement of the magnetic head element 10 (10A, 10B) in a direction perpendicular to the plural data tracks of the magnetic disc 1, that is along the radius of the magnetic disc 1, and a scale mechanism 30 for producing the scale signal associated with the data tracks of the magnetic disc 1.

The controller 151 is a site for controlling the entire disc drive device and may, for example, be constituted by a micro-computer. Specifically, the controller 151 performs control of the rotational driving of the disc 1, movement control of the magnetic head element 10, or buffering of the recording/reproducing data or interface control.

A detection signals from a detector 116 for optically or mechanically detecting the discriminating hole 7 of the magnetic disc 1 is sent via a disc type verifying circuit 117 as a mode signal to the controller 115.

The magnetic disc 1 is run in rotation by a spindle motor 114. The lower-order disc 1B is run in rotation by the spindle motor 114 at an rpm of approximately 300 to 600, while the upper order disc 1A is run in rotation at an rpm of approximately 1200 to 3600.

A tracking controller 118 is provided for controlling the movement operation of the movement mechanism 16 in the magnetic head unit 115. This tracking controller 118 is provided with an upper order tracking control circuit 118a for performing tracking control on loading the upper order disc 1A and with a lower order tracking control circuit 118b for performing tracking control on loading the lowerorder disc 1B.

The tracking controller 118 controls a magnetic head driving circuit 119, based on a command from the controller 151 and on the tracking control signal, and applies the driving power to a voice coil motor in the movement mechanism 16, as later explained, to cause movement of the magnetic head element 10.

The upper order tracking control circuit 118a performs tracking based on the address information recorded from the outset in the data tracks of the disc 1A.

The scale mechanism 30 in the magnetic head unit 115 is responsive to the movement of the magnetic head element 10 to output a scale signal in the form of a sinusoidal wave associated with each data track. The scale signal is routed to the controller 151.

Since there is no address information on the disc in the case of the lower-order disc 1B, the top and bottom values of the scale signal corresponding to the respective data tracks are used for controlling the track movement of the magnetic head element 10. Thus, on loading the lower-order disc 1B, the magnetic head element 10 is moved in the radial direction of the disc. The top and bottom values of the scale signal, produced at this time, are stored in a state corresponding to the respective data tracks.

In the memory 111, formed by an SRAM or a DRAM, the top and bottom values, detected in association with the respective data tracks, are stored.

The lower order tracking control circuit 118b performs tracking control by the current track information discriminated by the controller 151 with the aid of the information stored in the memory 111. The tracking control operates as track follow-up as will be explained subsequently.

The recording/reproducing system, connected to the head chips for the lower-order disc 1B in the magnetic head elements 10A, 10B, includes an amplifier circuit 121, a modem 122, a formatting/deformatting circuit 123, an error processing circuit 124, a buffer memory 125 and an FDD interface 126 which is an interface IF for a pre-existing FDD (floppy disc drive).

The recording/reproducing system, connected to the head chips for the upper order disc 1A in the magnetic head elements 10A, 10B, includes an amplifier circuit 131, a modem 132, a formatting/deformatting circuit 133, an error processing circuit 134, a buffer memory 135 and an IDE (intelligent drive electronics) interface 136 for a large capacity data recording device, such as a hard disc.

The FDD interface 126 is an interface termed a 3.5 inch micro-floppy disc interface. This interface has the function of directly reading and writing the magnetic information of the disc by the peripheral LSI termed the FDC (floppy disc controller) and is controlled by the control method of the lowest level in the current personal computer. Thus, by recording the minimum system files on the lower-order disc 1B(floppy disc), startup can be from the floppy disc even if startup from other data storage devices is not possible.

On the other hand, the IDE interface 136 is frequently used as an interface of a storage equipment, such as an internal hard disc device in a personal computer, and has a high transfer rate and a high control function. However, at least one driving device is provided on each of the majority of floppy disc drive devices in consideration that the basic IS cannot be started on the occasion of hard disc crash.

This type of the floppy disc interface directly uses an interface manufactured for an early version of the 8-bit CPU or a 16-bit personal computer. This interface is scarcely changed since the time the 8 inch floppy disc made its debut and is thought of as representing the de-facto standard. The floppy disc device in the personal computer has been widely used extensively as the external storage device for the computer before the time the hard disc was first offered to the market. In the majority of the personal computers, now marketed, startup from the floppy disc is designed to be possible by the hardware and a startup ROM mounted on the substrate.

If, in this hard disc device, the lower-order disc 1B is to be recorded or reproduced, an access demand for recording/reproduction is raised from an external host computer to the FDD interface 126, whereupon the data for recording is recorded from the host computer, or the data is reproduced from the lower-order disc 1B.

Specifically, the data for recording from the host computer etc is stored via the FDD interface 126 in the buffer memory 125. The data for recording from the buffer memory 125 is sent to the error processing circuit 124 where the CRC etc is generated and appended to the data for recording. The resulting data is sent to the formatting/deformatting circuit 123 for conversion to data of a pre-set format having a sector structure suited to the recording of the lower-order disc 1B. The formatted data is sent to the modem 122 where it is subjected to pre-set digital modulation, such as MFM. The resulting modulated data is amplified by the amplifier circuit 121 and thence supplied to the head chips of the magnetic head elements 10A, 10B for the lower-order disc 1B for recording on the disc 1B.

The operation for reproduction is the reverse of that for recording described above. That is, data reproduced from the disc 1B by the magnetic head elements 10A, 10B are amplified by the amplifier circuit 121 and digitally demodulated by the modem 122 so as to be then deformatted by the formatting/deformatting circuit 123. The deformatted data is checked for errors by the error processing circuit 124 and transiently stored in the buffer memory 125. The data then is routed via the FDD interface 126 to, for example, a host computer.

For recording/reproducing the upper order disc 1A, an access demand for recording/reproduction is raised from, for example, the external host computer to the IDE interface 136 to effect recording of data for recording on the disc 1A or data reproduction from the disc 1A.

Specifically, during recording, the recording data is stored via the IDE interface 136 on the buffer memory 135. The data for recording from the buffer memory 136 is routed to the error processing circuit 134 where parities or error correction codes are appended to the data for recording. The data from the error processing circuit 134 are routed to the formatting/deformatting circuit 133 for conversion to data of the pre-set format having a sector structure suited for recording on the upper order disc 1A. The formatted data is routed to the modem 132 where it is processed with, for example, digital modulation, such as MFM, and amplified by the amplifier circuit 131. The resulting data is routed to the head chips of the magnetic head elements 10A, 10B for the upper order disc 1A for recording on the disc 1A.

In reproduction, data read out from the disc 1A by the magnetic head elements 10A, 10B are amplified by the amplifier circuit 131 and digitally demodulated by the modem 132 so as to be then deformatted by the formatting/deformatting circuit 133. The deformatted data is corrected for errors in the error processing circuit 134 and transiently stored in the buffer memory 135. The stored data then is sent via the IDE interface 136 to e.g., the host computer.

2. Structure of a Magnetic Head Unit

Figure 3:
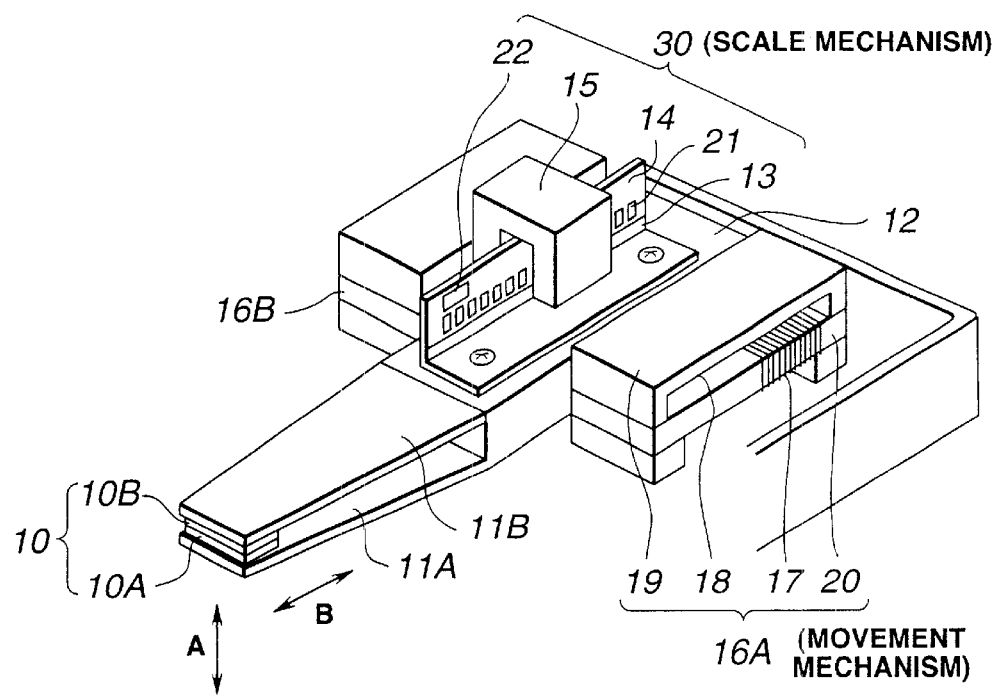
FIG. 3 is a perspective view showing a magnetic head portion of the recording/reproducing apparatus embodying the present invention.

FIG. 3 shows an illustrative structure of the magnetic head unit 115.

As shown, the magnetic head unit 115 includes a movement mechanism 16 (16A, 16B) for causing movement of the magnetic head element 10, a head carriage 12 moved by the movement mechanism 16 in the direction along the radius of the disc, an arm unit 11, made up of arms 11A, 11B, the proximal ends of which are supported by the head carriage 12, and the scale mechanism 30 formed on the head carriage 12.

The magnetic head elements 10A, 10B are mounted facing the free ends of the arms 11A, 11B. The magnetic head elements 10A, 10B are provided with lower order gaps for data recording/reproduction for the lower order disc and upper order gaps for data recording/reproduction for the upper order disc, although these gaps are not shown.

The arms 11A, 11B of the arm unit 11 are substantially in the form of thin plates and are mounted for movement in a mutually facing direction A, that is in a direction for contact with and away from the signal recording surface of the magnetic disc 1. The arms 11A, 11B are mounted on the head carriage 12 so that the magnetic head elements 10A, 10B are supported in position on the magnetic disc 1 and so that a pre-set thrusting load is applied to the magnetic disc 1 by the magnetic head elements 10A, 10B.

Specifically, in recording/reproducing the lower-order disc 1B by the magnetic head elements 10A, 10B, there is applied the load suitable for thrusting the magnetic head elements 10A, 10B into contact with the lower-order disc 1B for recording/reproducing data, if the lower-order disc 1B is to be recorded/reproduced by the magnetic head elements 10A, 10B. Similarly, there is applied the load suitable for causing the magnetic head elements 10A, 10B to be floated from the upper-order disc 1A for recording/reproducing data, if the upper-order disc 1A is to be recorded/reproduced by the magnetic head elements 10A, 10B.

The movement mechanism 16 (16A, 16B) is constituted by a voice coil motor which is a so-called linear motor. The movement mechanism 16 is made up of a voice coil motor coil 17, a magnet 18 and yokes 19, 20.

The movement mechanisms 16A, 16B, are arranged on both sides of the lateral sides o the head carriage 12, that is with the head carriage 12 in-between, and are similar in structure to each other.

In the movement mechanisms 16A, 16B, the yokes 19, 20 are secured to, for example, a chassis of the disc drive device, with a magnet 18 being mounted on the yoke 19. The yoke 20 is passed through the voice coil motor coil 17 so that the voice coil motor coil 17 will be movable with respect to the yoke 20. The magnet 18 is mounted on the inner lateral side of the yoke 19 facing the yoke 20.

In the movement mechanisms 16A, 16B, constructed as described above, if the voltage is applied to the voice coil motor coil 17, the latter is driven with respect to the yoke 20.

The voice coil motor coil 17 is mounted on the head carriage 12, so that, if the voice coil motor coil 17 is driven, the head carriage 12 is moved in the radial direction B of the magnetic disc 1. That is, the magnetic head elements 10A, 10B on the arms 11A, 11B mounted on the head carriage 12 by the movement mechanisms 16A, 16B are moved in the radial direction B of the magnetic disc 1.

As described above, the movement mechanisms 16A, 16B are driven by a magnetic head driving circuit 116 fed from the controller 115 and the tracking controller 118 with head driving signals and with tracking signals. That is, the movement mechanisms 16A, 16B are responsive to the head driving signals to cause movement of the magnetic head element 10 in the radial direction B of the magnetic disc 1. The movement mechanisms 16A, 16B are also responsive to the tracking signals to cause tracking driving of the magnetic head 10 similarly in the radial direction B of the magnetic disc 1. Meanwhile, data track feed of the magnetic head 10 by the movement mechanisms 16A, 16B is executed responsive to track feed request signals sent from the external host computer.

The scale mechanism 30 is provided on the head carriage 12.

This scale mechanism 30, causing movement of the magnetic head element 10 and generation of a sine wave (scale signal) associated with data tracks, is made up of a gauge holder 13, secured to the head carriage 12, a track gauge 14, mounted on the head carriage 12 via gauge holder 13, and an optical encoder 15 fixedly mounted to a securing mechanism, not shown.

The scale mechanism 30 and the scale signal are hereinafter explained.

3. Scale Mechanism and Scale Signal

The track gauge 14 is formed substantially as a thin plate and is mounted on the head carriage 12 via the gauge holder 13. This track gauge 14 is arranged parallel to the radial direction B of the magnetic disc 1.

Figure 4A:
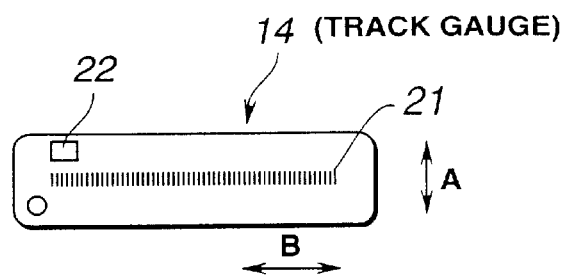
FIGS. 4(4A–4B) schematically shows s a track gauge of a scale mechanism of the preferred embodiment of the present invention.
Figure 4B:
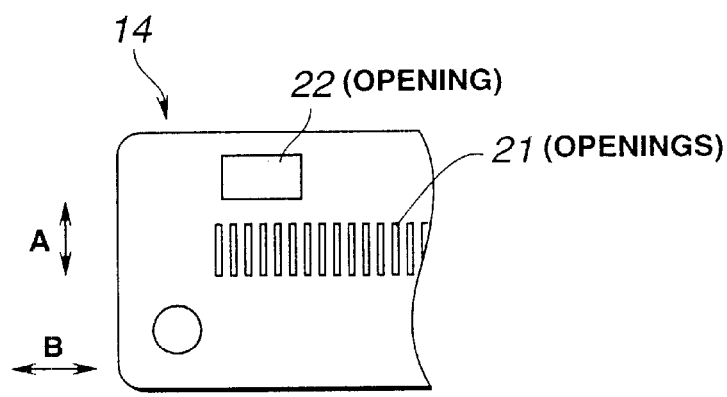

The track gauge 14 is provided with plural first openings 21, arranged in the radial direction B, and a second opening 22, arranged towards the magnetic disc 10, as shown in FIGS. 4a and 4b.

Figure 5:
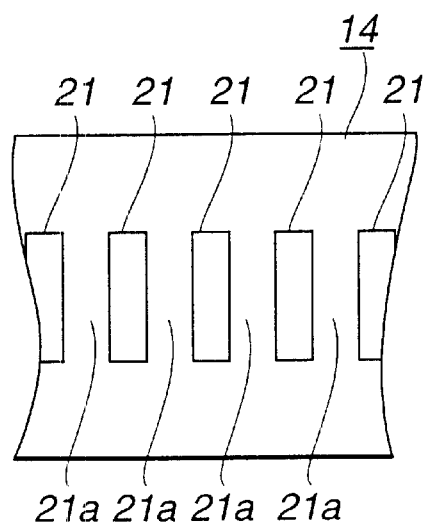
FIG. 5 schematically shows an opening of the track gauge of the scale mechanism of the preferred embodiment.

The plural first openings 21 are substantially of the same profile and opened substantially in the form of rectangles, as shown in FIG. 5. The openings 21 are formed on the track gauge 14 at a pitch substantially equal to the track pitch of the lower-order disc 1B. Although the openings are herein shown to be of larger size, for convenience in illustration, these openings are actually in the form of appreciably fine slits.

Between the respective neighboring openings 21, there are formed light shielding portions 21 for shielding the light from a light source 23.

It is noted that a forming area in the track gauge 14 for the openings 21 along the radial direction B is slightly broader than the width of the track area formed on the lower-order disc 1B, that is, the number of the first openings 21 is selected substantially to cope with the data tracks of the lower-order disc 1B.

On the other hand, the second opening 22 is arranged adjacent to the array of the first openings 21 for extending along an edge of the array of the first openings 21. Specifically, the second opening 22 has its position on the track gauge 14 set so that, when the head carriage 12 is moved until the magnetic head element 10 is arranged on the outermost data track in the data track area of the magnetic disc 1, the second opening 22 is located within the optical encoder 15.

That is, the second opening 22 is provided to give the information by which to comprehend that the magnetic head 10 is located at the outermost data track.

The track gauge 14 is mounted on the head carriage 12 and hence is moved in the radial direction B along with the head carriage 12 by the operation of the movement mechanism 16.

Figure 6:
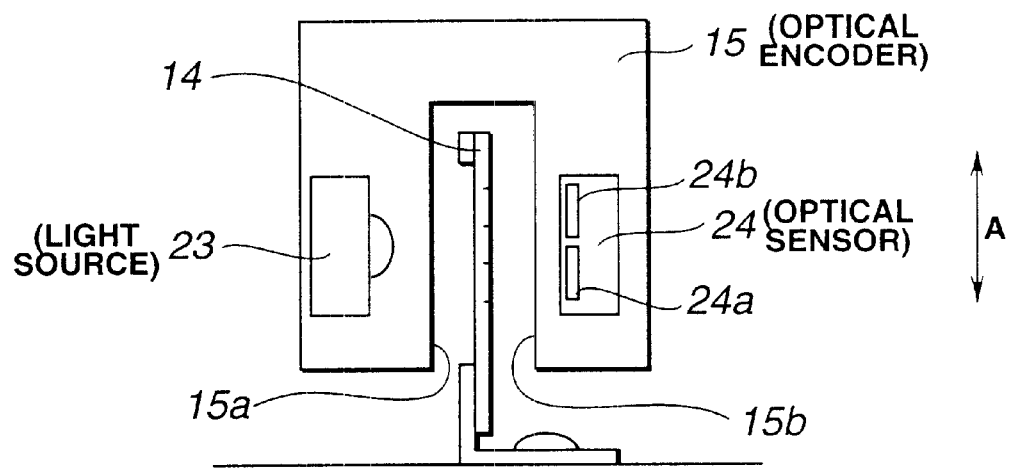
FIG. 6 an optical encoder of the scale mechanism of the preferred embodiment.

The optical encoder 15 includes a light source 23 and an optical sensor 24, arranged on both lateral sides of the track gauge 14, as shown in FIG. 6.

The optical encoder 15 is secured by securing means, not shown, such that the optical encoder 15 cannot be moved by the movement mechanism 16. Thus, the optical encoder 15 is able to recognize relative movement of the track gauge 14.

The light source 23 is e.g., a light emitting diode (LED), and is arranged on an inner lateral surface 15a of the optical encoder 15.

The optical sensor 24 is e.g., a phototransistor, and is arranged on an inner lateral surface 15b facing the inner lateral surface 15a.

The light emitted by the light source 23 provided on the optical encoder 15 is received by the optical sensor 24 via the first openings 21 or the second opening 22 provided in the track gauge 14 facing the light source 23.

Thus, on light emission from the light source 23 arranged in the optical encoder 15, the emitted light is received by the optical sensor 24 via the first openings 21 or the second opening 22 provided in the track gauge 14 facing the light source 23.

Figure 7:
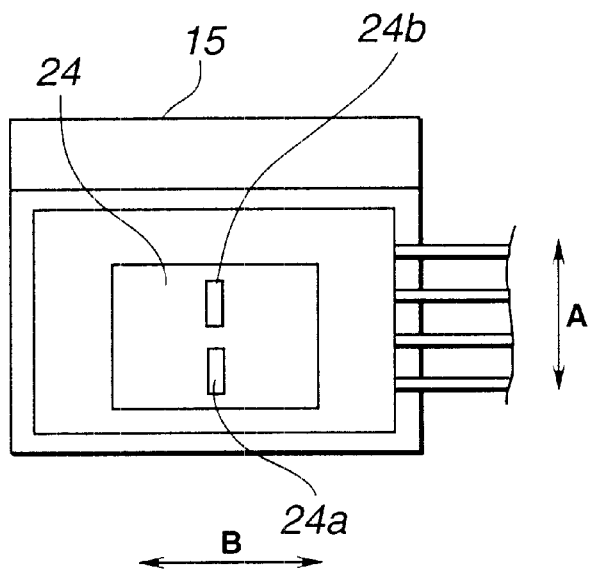
FIG. 7, similarly to FIG. 6, schematically shows the scale mechanism of the preferred embodiment.

Referring to FIGS. 6 and 7, the optical sensor 24 includes a first phototransistor 24a, provided for receiving the light from the light source 23, transmitted through the first openings 21 in the track gauge 14, and a second phototransistor 24b, provided for receiving the light from the light source 23, transmitted through the second opening 22.

In the optical encoder 15, if the head carriage 12 is moved in the radial direction B, the light from the light source 23 is passed through the first openings 21 in the track gauge 14 and received by the first phototransistor 24a, so that electric signals converted from the light is produced as an output of the first phototransistor 24a.

If the light from the light source 23 is transmitted through the second opening 22 and received by the second phototransistor 24b, there are produced electrical signals corresponding to the received light level as an output of the second phototransistor 24b.

If the head carriage 12 is moved in this manner, that is if the track gauge 14 is moved relative to the optical encoder 15, the following signals are obtained from the optical sensor 24.

If the head carriage 12 is moved in the direction indicated B, the first openings 21 and the shielding portions 21 a alternately travel through the light path between the light source 23 and the optical sensor 24.

Figure 8:
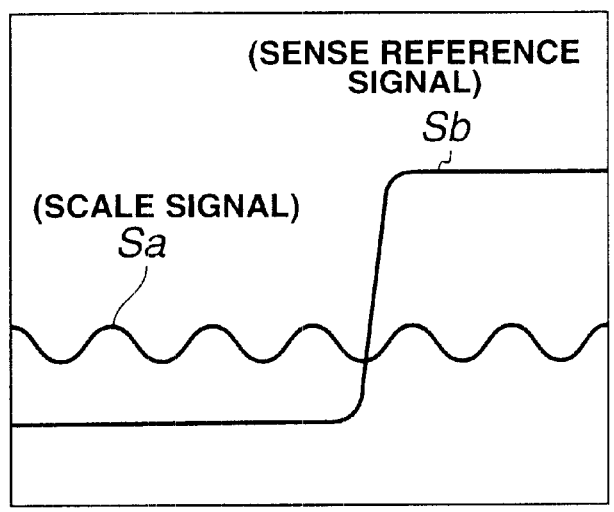
FIG. 8 schematically shows scale signal obtained from the scale mechanism of the preferred embodiment.

Thus, the first phototransistor 24a receives the differential light intensities from the light source 23, caused by the travel of the first openings 21 and the shielding portions 21a, to generate substantially sinusoidal scale signal Sa, as shown in FIG. 8.

Since the first openings 21 are formed at a pitch equal to the track pitch of the data tracks, the period of the scale signal Sa corresponds to the period of movement through a data track on the disc. That is, the information of a period of the sinusoidal wave of the scale signal Sa proves the information corresponding to each data track on the disc.

On the other hand, if the magnetic head element 10 is moved towards the outer rim of the disc, the second phototransistor 24b generates a signal Sb changing substantially as step-like wave, referred to below as a sense reference signal, by the second opening 22 of the track gauge 14 travelling between the light source 23 and the optical sensor 24, as shown in FIG. 8.

The up-going time of the step-like wave of the sense reference signal, indicates that the magnetic head element 10 has been positioned on a specified data track on the outermost rim side within the data track area.

Thus, the position corresponding to a data track in the vicinity of the outermost rim of the data track area is specified by the sense reference signal Sb and, using this as a reference, the position corresponding to each data track can be specified by the scale signal Sa.

Based on the respective signals, thus obtained, the position information corresponding to each data track of the lower-order disc 1B is produced.

Figure 9:
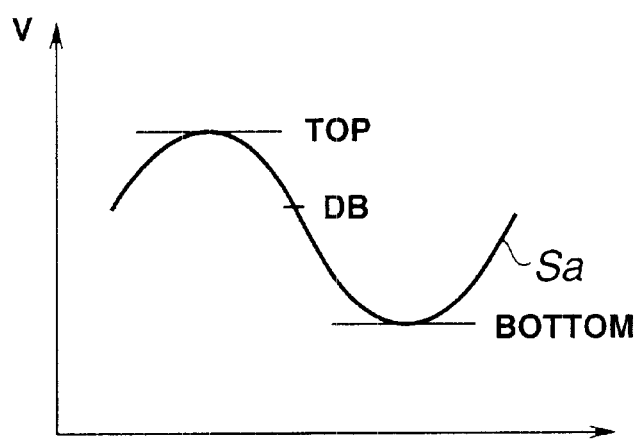
FIG. 9 schematically shows top and bottom values of scale signal obtained from the scale mechanism of the preferred embodiment.

Specifically, the top and bottom values of the scale signal Sa, shown in FIG. 9, are stored in the memory 111.

It is assumed that, in the preferred embodiment, the zero-crossing point of the scale signal Sa corresponds to the center of the data track with a period from the zero-crossing point being one track pitch. Therefore, each one top value and each one bottom value, shown in FIG. 9, are associated with each data track.

Figure 10A:
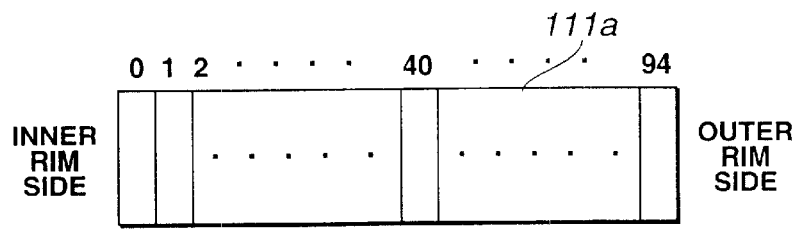
FIGS. 10(10A–10B) schematically shows a memory for storage of top and bottom values of a the recording/reproducing apparatus embodying the present invention.
Figure 10B:
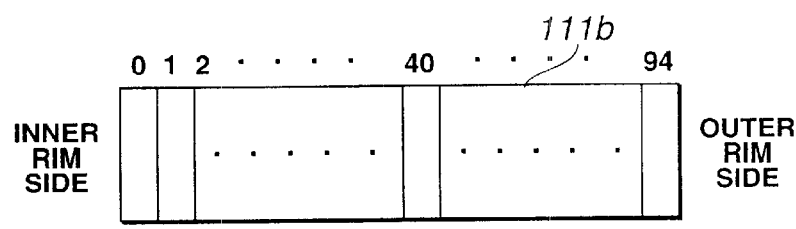

For example, there are provided two storage areas 111a, 111b for storage of the top and bottom values, respectively, as shown in FIGS. 10a and 10b. In these storage areas, the top and bottom values are sequentially recorded in association with the respective data tracks. These top and bottom values are usable as data for identifying the positions of the magnetic head element 10 in the data track area and the position of the magnetic head element 10 between the data tracks during track feed.

Meanwhile, the position in the data track area of the magnetic head element 10 can be detected, as the number of the current data track in which the magnetic head element 10 is positioned, by counting the top or bottom values of the scale signal Sa.

The storage area 111a for storage of the top values and the storage area 111b for storage of the bottom values of the memory 111 are configured for storing a number of the top values and a number of the bottom values which are larger than the number of the first openings 21 formed in the track gauge 14, such as 94 top values and 94 bottom values, respectively. It is assumed that the data track area of the lower order disc 10 is made up of 80 data tracks.

Thus, in the storage areas 111a, 111b, there are provided areas in which to store top and bottom values not associated with the data tracks.

Moreover, the number of the first openings 21 in the track gauge 14 is smaller than the number of the storable values in the storage areas 111a, 111b, for example, is set to 90, whereby there may also be provided in the storage areas 111a, 111b that are not associated with the first openings 21.

Meanwhile, the operation of acquiring the information from the optical encoder 15 and storing the top and bottom values is carried out only on loading the lower-order disc 1B, since the lower-order disc 1B itself is devoid of the so-called position information indicating the data track position.

The top and bottom values, stored in the storage areas 111a, 111b of FIG. 10, are normalized by a pre-set processing and used in e.g., track feed control as the track position information.

Figure 11:
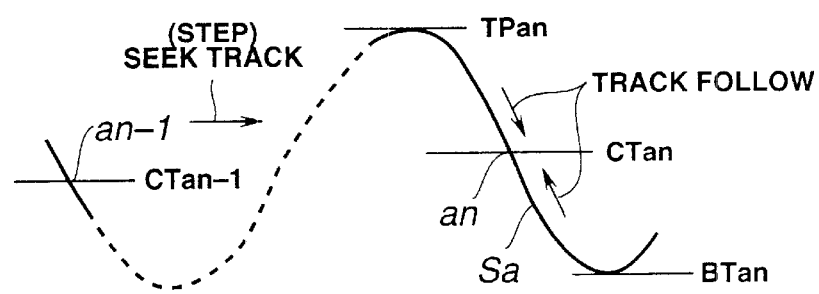
FIG. 11 schematically shows the track follow in an embodiment of the present invention.

Referring to FIG. 11, the lower order tracking control circuit 118b performs tracking control based on the scale signal Sa obtained on moving the magnetic head 10 and a center value CT calculated using the stored top and bottom values. In FIG. 11, the points of intersection of the scale signal Sa and the center value CT an−1, an, . . . , are associated with the centers of the respective data tracks of the lower order disc. Therefore, the lower order tracking control circuit 118b performs tracking by controlling the magnetic head 10 so that, when the magnetic head element 10 is moved onto the desired data track, that is when the point of intersection associated with the pre-set data track is reached, the curve SA converges to the point of intersection. This tracking operation is referred to below as track follow.

Specifically, this track follow operation finds the center value Ctan from the top value Tpan and the bottom value Ctan stored in association with the data track. The scale signal Sa then is monitored and the movement mechanism 16 (voice coil motor) is controlled so that the scale signal Sa will be coincident with the center value Ctan in order to realize the operation of convergence to the point of intersection an as the track follow.

If the data track, represented by the point of intersection an−1 in FIG. 11, the center value Ctan−1 is found from the top and bottom values stored for the data track and control is performed so that the scale signal Sa being monitored will be coincident with the center value Ctan−1.

4. Fixed Speed Servo Control System

If the lower order disc 1B is loaded on the disc drive device for data recording/reproduction, the top and bottom values of the scale signal Sa associated with the data track need to be stored in the memory 111 in order to perform feed control of the magnetic head element 10 and track follow control. Therefore, if the lower-order disc 1B is loaded, the disc drive device performs the processing of causing movement of the magnetic head element 10 (head carriage 12) to scan the data track area of the lower-order disc 1B and of detecting the top and bottom values of the scale signal Sa obtained at this time to store the detected values in the memory 1211.

Since the amplitude of the scale signal Sa depends on the speed of movement of the track gauge 14, the track gauge 14 and hence the head carriage 12 need to be moved at a fixed speed in order to acquire the top and bottom values, otherwise the top or bottom values cannot be measured accurately. Thus, in acquiring the top and bottom values, constant speed servo control is used for the movement operation by the movement mechanism 16.

The constant servo control system is hereinafter explained.

As the method for constant servo control, the scale signal Sa is sampled every 80 μsec, for example, and the speed value at each sampling time is found as the difference between the sample value of the scale signal Sa at the time point and the sample value of the scale signal Sa prevailing at a directly previous sampling time.

The speed value as found at each sampling time is used as the measured speed value, and a control voltage is generated so that the measured speed value will be equal to the reference speed value as set for a target speed. The magnetic head driving circuit 119 is responsive to the control voltage to apply a power to the voice coil motor coil 17 of the movement mechanism 16 of the magnetic head driving circuit 119.

The scale signal Sa is a waveform approximated by a sine wave. In order to use this for the constant speed servo, the portion of the sinusoidal scale signal Sa from 90° to 270°, indicated in FIG. 12, is deemed to be a straight portion to set a reference speed value.

Figure 12:
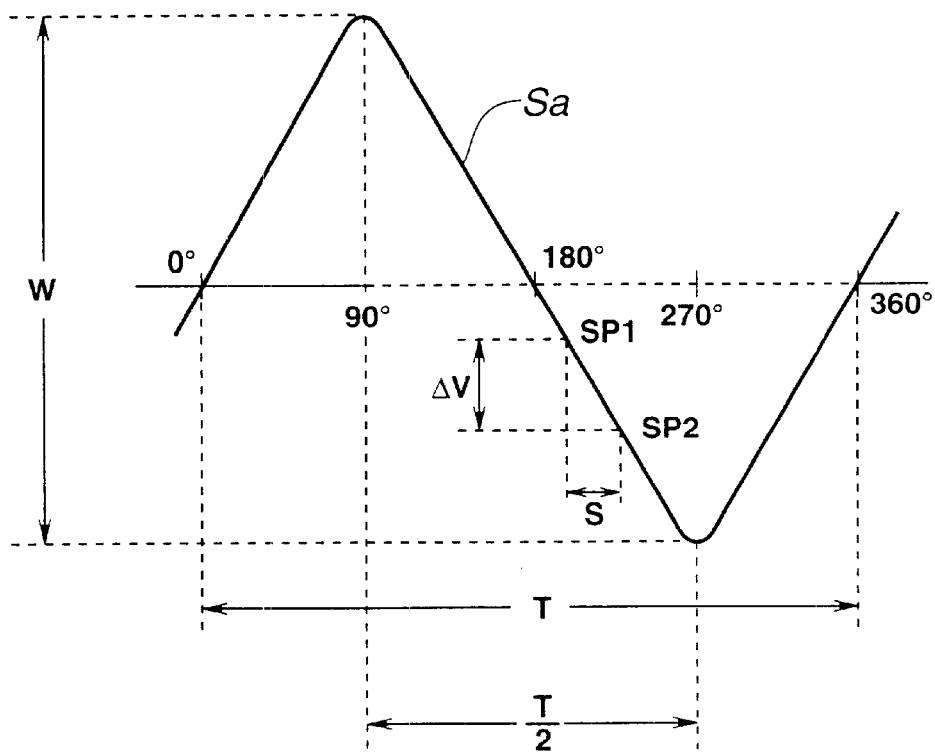
FIG. 12 schematically shows the control system of the fixed speed movement servo embodying the present invention.

Referring to FIG. 12, if the data track period is T, the amplitude of the scale signal Sa is W and the sampling interval is S, T/(2·S) sampling points ( ... SP1, SP2, ... ) are present in the straight portion of T/2.

The difference value $\Delta V$ of the scale signal, changing during one sampling period, is $\Delta V = W/(T/(2 \cdot S))$.

Therefore, this $\Delta V$ is to be the reference sped value.

Since the difference between the sample value of the scale signal Sa at a sampling time point and the sample value of the scale signal Sa prevailing at a directly previous sampling time is the measured speed value, the measured speed value theoretically is the reference speed value if constant speed running is done at a pre-set speed.

It is seen from above that the control voltage V for executing the constant speed servo is found from control voltage V=gain G×(|reference speed value−measured speed value|).

It is noted that such a voice coil motor is used in which the driving power is generated in the forward and reverse directions depending on the polarity and in which the driving power becomes zero at the zero control voltage.

5. Constant Speed Servo on Loading a Lower Order Disc and Scale Information Acquiring Processing By the above-described constant speed servo, the constant speed movement by the movement mechanism 16 is realized. It is noted that the reference speed value as the parameter for servo control and the setting of the gain G need to be such as to realize the optimum movement operation for acquiring the scale signal. In particular, optimum servo parameters for realizing constant speed movement at a suitable speed differ with difference from one disc drive device to another, by changes with lapse of time or with the different states of the angular mounting positions of the disc drive device. Therefore, if the servo parameters are of fixed values, the acquired top and bottom values of the scale signal Sa occasionally become inappropriate because the amplitude of the scale signal Sa in particular depends on the movement speed.

Thus, in the preferred embodiment, servo parameters for realizing the constant speed servo within a pre-set speed range suitable for acquiring the top and bottom values are automatically calculated on loading the lower-order disc 1B. The servo parameters thus found are then used to execute the movement y the constant speed servo to acquire the top and bottom values associated with the respective data tracks.

Figure 13:
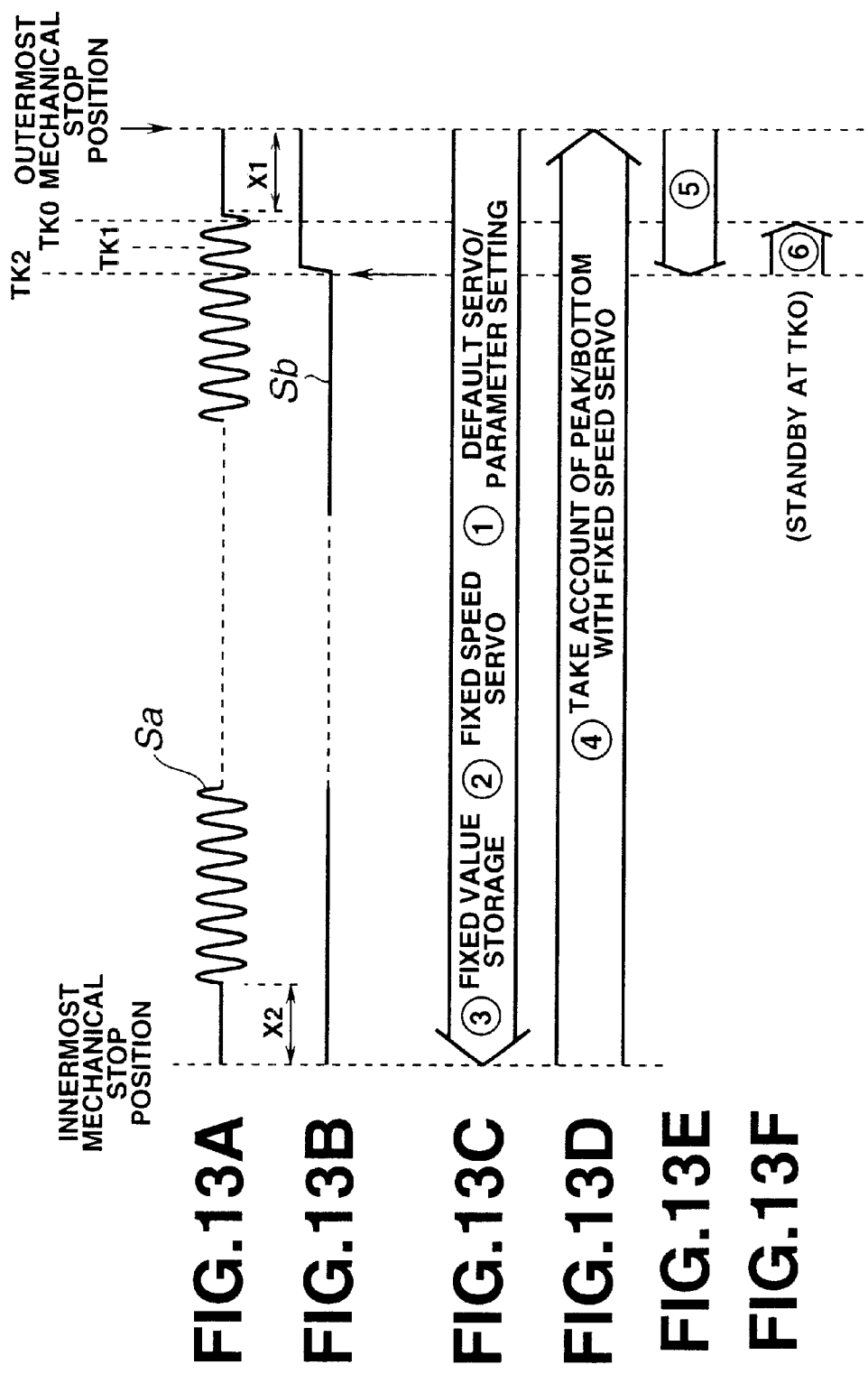
FIGS. 13(13A, 13B, 13C, 13D, 13E and 13F) schematically shows the operation at the time of a constant speed movement servo embodying the present invention.

FIG. 13 schematically shows the operation of the disc drive device on loading the lower-order disc 1B. It is noted that loading of the lower-order disc 1B is verified by a detection signal from the detector 16 being sent via disc type verifying circuit 117 as a mode signal to the controller 15.

FIG. 13a schematically shows the scale signal Sa obtained in association with the radial position on the disc during movement from the innermost rim to the outermost rim of the disc. FIG. 13b shows the sense reference signal Sb obtained in similar manner.

An innermost mechanical stop position means a limit movement position when the magnetic head element 10 is at the innermost rim on the disc 1. Similarly, an outermost mechanical stop position means a limit movement position when the magnetic head element 10 is at the outermost rim on the disc 1. The possible mechanical movement range is a range from the innermost mechanical stop position to the outermost mechanical stop position.

In this possible movement range, the scale signal Sa is not sinusoidal in a domain X1 on the outermost rim side and in a domain X2 on the innermost rim side. This is caused by the position setting of the opening 21 on the outermost rim and that on the innermost rim in the track gauge 14.

The sense reference signal Sb rises at a position on the disc corresponding to the data track number 2 (track TK2) due to the fact that the second opening 22 is provided at a position corresponding to the track TK2.

In FIGS. 13c, 13d, 13e and 13f, arrows indicate the movement operation on loading of the lower-order disc 1B.

If the lower-order disc 1B is loaded on the present disc drive device, the magnetic head element 10 is moved from the outermost rim towards the innermost rim, as shown in FIG. 13c.

During this movement, default servo/parameter decision is carried out as an operation ①. The default servo is the operation of applying fixed speed servo by the servo parameter as a pre-set default value (initial value) to execute the constant-speed movement. The servo parameter, as the default value, is such a value that is used necessarily for movement under a variety of conceivable conditions of the disc drive device, such as difference from one disc drive device to another or discrimination in the mounting positions.

Based on the scale signal Sa, observed during constant speed movement in the default servo, optimum servo parameters are calculated.

If the servo parameters are found, constant speed servo by the servo parameters, thus found, is applied, as the magnetic head element 10 is continued to be moved towards the inner rim of the disc.

Then, after lapse of a pre-set time, the magnetic head element 10 is moved at a control voltage as the fixed value, in view of operational reliability, by way of an operation ③. By this operation, the magnetic head element 10 is to be moved to the innermost position.

If, by the above-described operation, the movement to the innermost position comes to a close, the magnetic head 10 is moved towards the outer rim of the disc, as shown in FIG. 13d.

This movement is the operation ④ in which the constant speed servo is applied by an optimum servo parameter found by the operation ①. During this time, the top and bottom values of the scale signal Sa, associated with the respective data tracks, are acquired and stored in the memory 111.

If the constant speed movement and acquisition of the top and bottom values as the operation ④ come to a close, such that the outermost position is reached, the processing for readying for subsequent actual recording/reproducing operations, shown in FIGS. 13e and 13f, is performed.

That is, the magnetic head element 10 is moved to the sense reference position when the sense reference signal Sb rises, by way of the operation ⑤. Since this sense a reference position corresponds to the track TK2, the magnetic head element 10 is moved by two tracks towards the outer rim, as an operation ⑥. The magnetic head element 10 then is at a stand-by state at a position of the track TK0.

During the loading of the lower-order disc 1B, the operation substantially as described above is performed. The processing by the controller 151 for realizing this operation is explained with reference to FIGS. 14 to 17. It is noted that the operation from ① to ⑥ shown in the flowchart of FIGS. 14 to 17 correspond to the operation from ① to ⑥ in FIG. 13.

Figure 14:
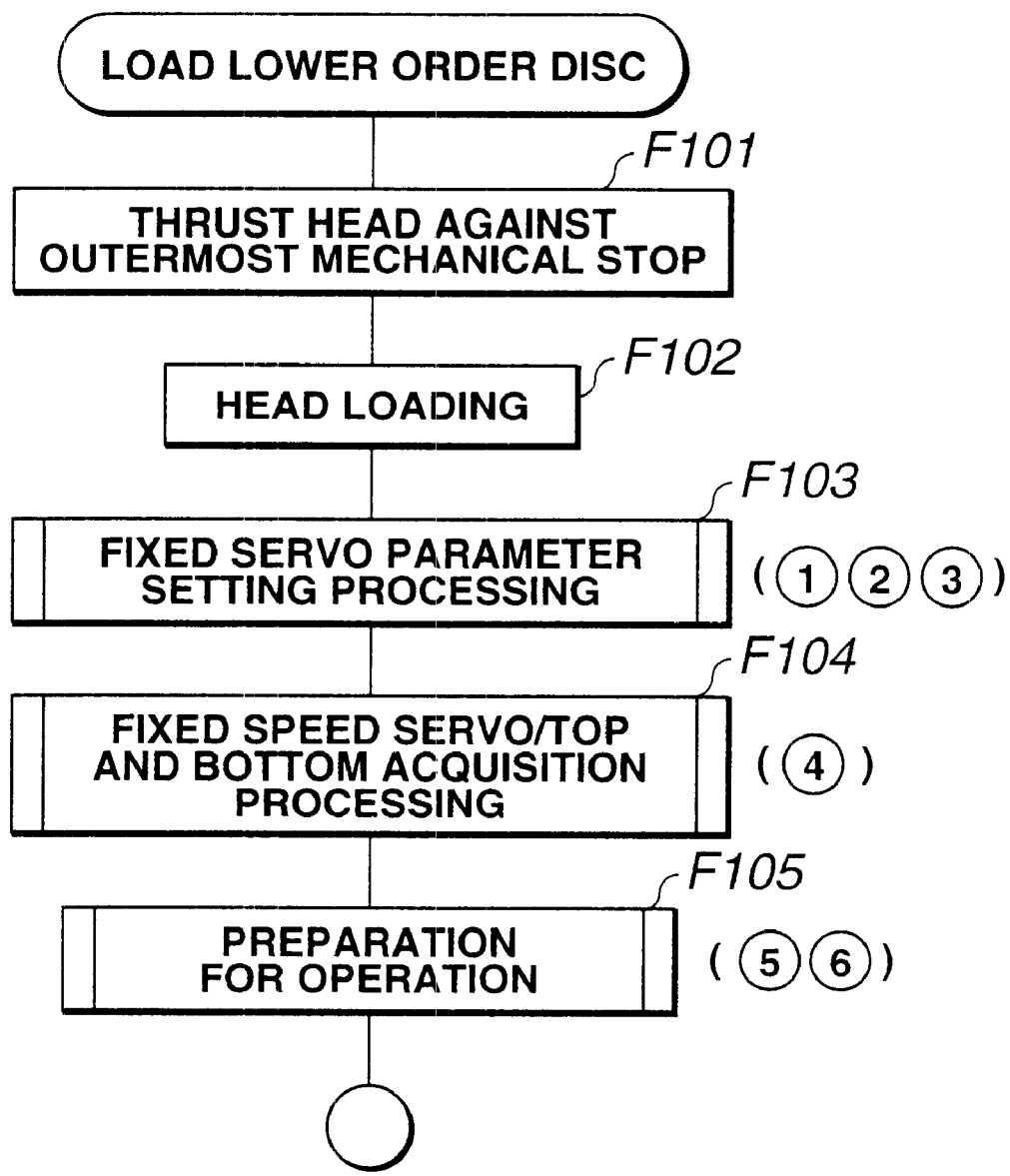
FIG. 14 is a flowchart for illustrating the operation for loading the lower-order disc according to an embodiment of the present invention.

FIG. 14 shows the processing of the controller 151 for the loading operation for the lower-order disc 1B explained in FIG. 13. If the lower-order disc 1B is loaded, the operation of thrusting the head to the position of the outermost mechanical stop position is executed at step F101, in order that, for preventing damages to the disc, the magnetic head 15 will be at the outermost rim position at the loading time.

The magnetic head then is loaded at step F102.

On completion of the head loading, constant servo parameter setting processing is carried out at step F103. This processing executes the above-described operations ① to ③.

After the end of the processing of step F103, the constant speed servo top/bottom acquiring operation then is carried out at step F104. This processing executes the operation ④.

Finally, the processing for operational readying, which executes the operations ⑤ and ⑥, is performed. If this operation comes to a close, the sequence of operations of loading the lower-order disc is completed.

Figure 15:
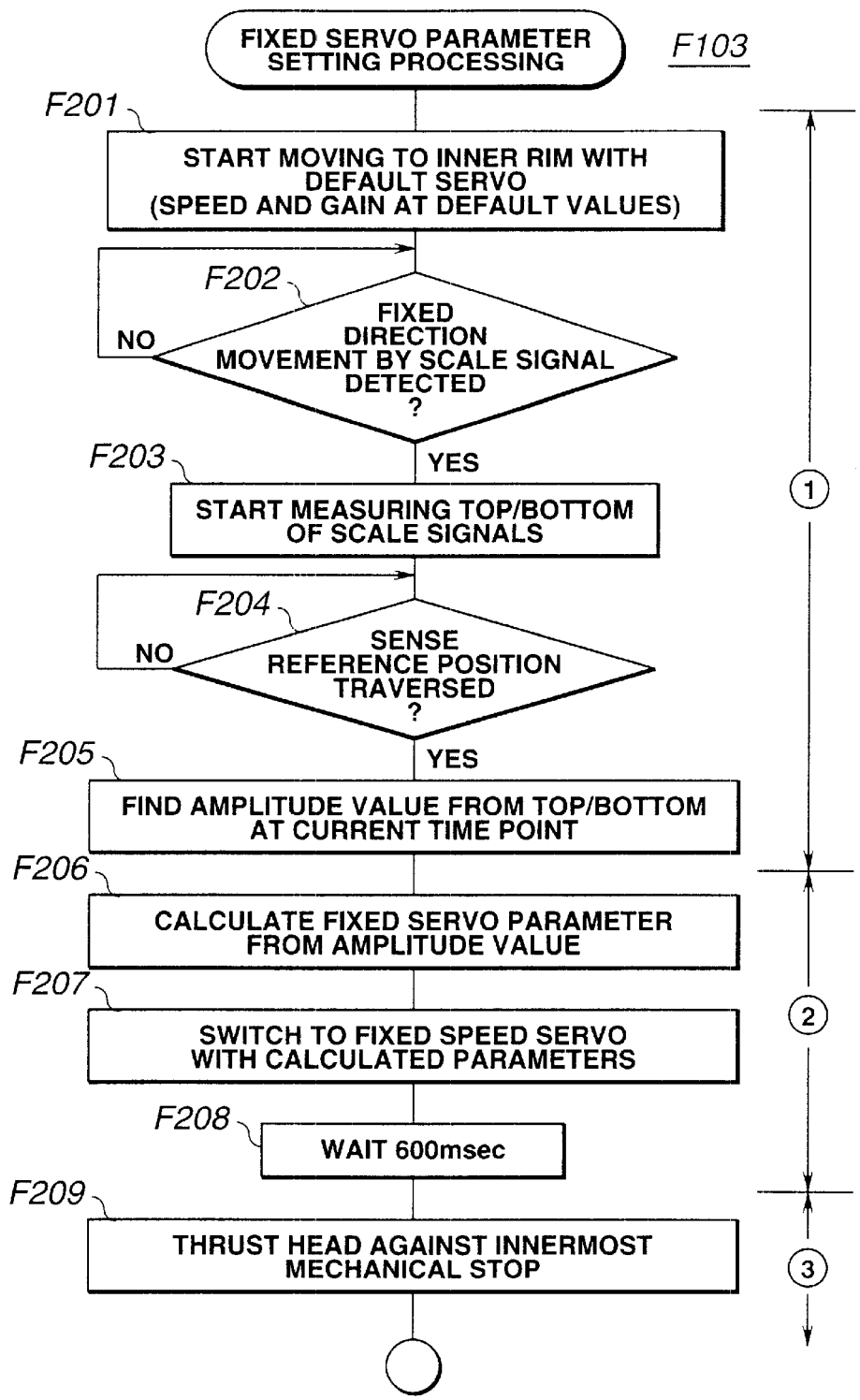
FIG. 15 is a flowchart for illustrating the processing for determining the fixed speed servo parameters according to an embodiment of the present invention.

The processing for setting the constant speed parameters at step F103 is explained in detail by referring to FIG. 15.

At step F103, the processing of steps F201 to F206 of FIG. 15 is performed for the above operation ①.

At this time, the magnetic head element 10 is at the outermost mechanical stop position, by the step F101 of FIG. 14. As the step F201, movement towards the inner rim is started by the default servo. With this default servo, the reference speed value and the gain G are initialized by this default servo, as mentioned above. These values are such values which will necessarily produce the movement without dependency on the difference from one disc drive device to another, chronological changes or posture of the disc drive device. For example, these initial values should be selected so that movement occurs even under a condition in which the disc drive device is tilted at ±80°.

If the constant speed movement by the default servo is started, a standby state is set to await start at step F202 of observation of movement in the constant direction by the scale signal. That is, since the sine wave as the scale signal Sa is not observed during the X1 domain shown in FIG. 13, the stand-by state is set to wait for acquisition of the sine wave as the scale signal Sa after passage through this domain.

If the sinusoidal wave signal, as the scale signal Sa, is obtained, that is if the movement of the head towards the inner rim of the disc is confirmed, the top and bottom values of the scale signal during one period of the scale signal Sa start to be measured. Specifically, the controller 151 inputs the scale signal Sa supplied from the optical encoder 15 of the scale mechanism 30 as digital signals to search for the maximum value (top value) and the minimum value (bottom value) during one period.

At step F204, a standby state is set for awaiting the movement until reaching the sense reference position detected by the sense reference signal Sb.

When the sense reference position is reached, the amplitude value of the scale signal Sa at this time point is found from the top and bottom values of the scale signal Sa at the time point during one period. That is, the absolute value of the difference between the top and bottom values is the amplitude level.

This standby state to await until the sense reference position is reached to measure the amplitude value is set because of slightly low reliability of the scale signal towards the outer rim side than that at the sense reference position. Specifically, more accurate amplitude values need to be found in view of the machining tolerance of the first openings 21.

If the amplitude value is found at step F205, optimum parameters for constant speed servo are calculated at step F206 based on the calculated amplitude value. That is, the reference speed value and the gain G are calculated. For example, optimum parameters (reference speed values and gain G) are found for executing the constant speed movement at 4 msec/track.

As for the reference speed value, it is equal to amplitude W/(T/2·S), as described above. Thus, the amplitude value calculated at step F205 is substituted as the value of the amplitude W. ad for T (one data track period), T=4 msec if the movement of 4 msec/track is targeted.

As for S (sampling period), it is set at a fixed value by the servo system, so that, for example, S=80 μsec.

By substituting the above numbers, proper reference speed value (=W/(T/2·S)) is calculated.

The reference amplitude value is the empirically found standard amplitude value of the scale signal. As the above-mentioned initial gain, the calculated standard amplitude value, initial gain and the calculated amplitude value are used.

If (standard amplitude value)×(initial gain)=reference calculated value R, it suffices if (calculated amplitude value)×(optimum gain)=reference calculated value R, such that the optimum gain G for the constant speed servo can be found by G=(reference calculated value)/(calculated amplitude value). Meanwhile, the reference calculated value means the amplitude value calculated at step F205.

If the optimum parameters have been calculated as described above, the fixed speed servo by the parameter calculated at step F207 is executed. That is, the operation ② is executed.

Since the control voltage V of the fixed speed servo is control voltage V=gain G×(|reference speed value−measured speed value|)

the gain G and the reference speed value in the above equation are to be changed from the respective initial values to the values calculated as described above.

After the fixed speed servo is started at step F207, a standby state is set to wait until movement reaches the innermost rim side. For example, the standby state continues for 600 msec at step F208.

This is a sufficient time value for the innermost rim to be reached at a rate of movement of 4 msec per track. That is, since the number of data tracks is 80, the time of 80×4=320 msec is needed if the totality of the data tracks is to be traversed. The standby time of 600 msec is set to give certain allowance in excess of 320 msec.

Since the standby time of 600 msec is set at step F208, the movement up to the innermost mechanical stop is normally finished. However, there are occasions wherein the operation is not performed under good conditions such that the innermost mechanical stop position has yet not been reached. Thus, at step F209, the movement mechanism 16 is driven at a fixed value as the operation ③ to thrust the head to the innermost mechanical stop position. That is, the head is thrust with a force of movement of a moderate strength in consideration that smooth movement is obstructed under some unpredictable troubles.

This thrusting gives rise to certain shock against the magnetic head unit 115. However, if the movement up to the innermost mechanical stop position is completed in a usual manner up to the innermost mechanical stop position, there is no shock applied to the magnetic head unit 115 despite the thrusting operation at step F209. That is, no mechanical movement occurs because the head is already in the thrust state.

If the processing at step F103 of FIG. 14 is executed by the processing sequence shown in FIG. 15, the fixed servo/top and bottom acquisition processing is carried out at step F104 of FIG. 14.

Figure 16:
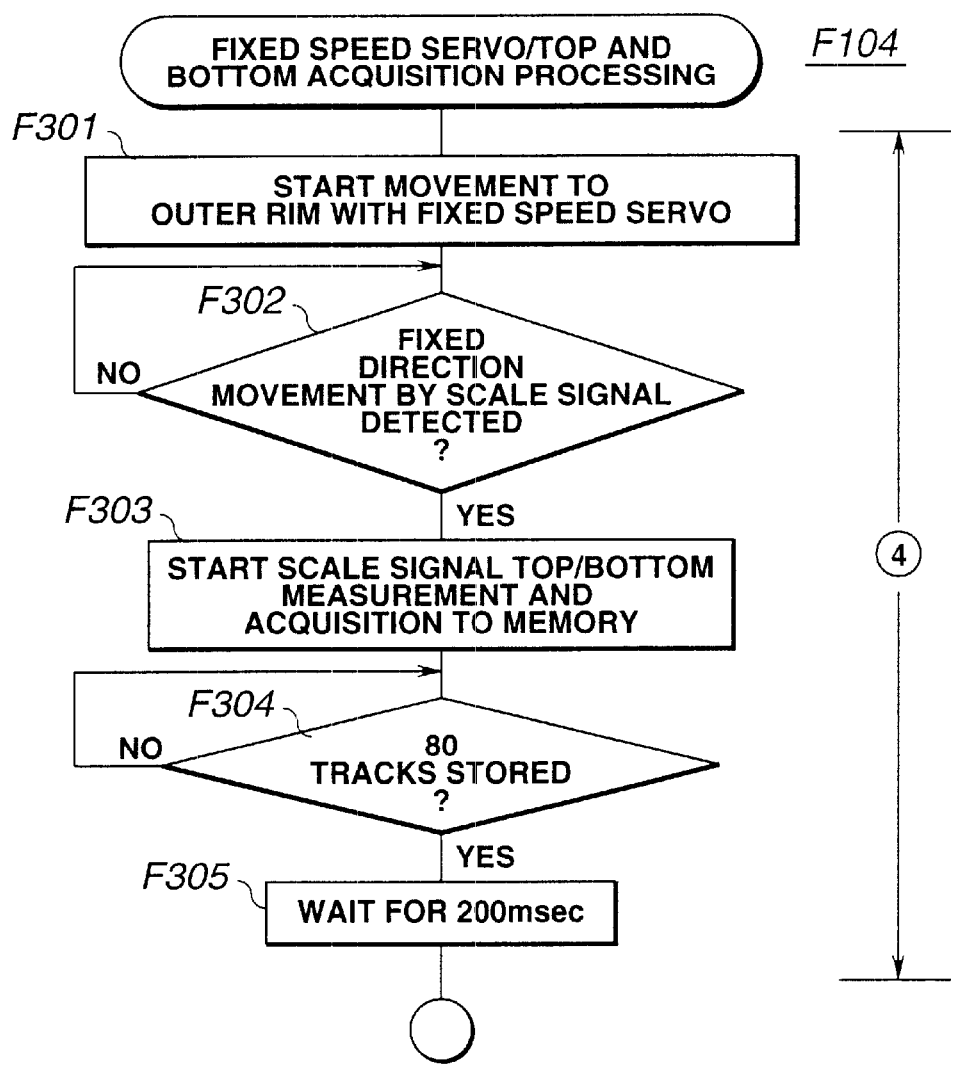
FIG. 16 is a flowchart for fixed speed servo/top and bottom acquiring processing according to an embodiment of the present invention.

The processing of this step F104, that is the processing of executing the operation ④, is shown in detail in FIG. 16.

First, at step F301, movement to the outer rim is started with the fixed speed servo employing the optimum servo parameters as calculated by the above processing. That is, the constant speed running is started at an optimum speed value for measuring the scale signal Sa.

If the fixed speed movement is started by the constant speed servo control, a standby state is set at step F302 to wait until movement in a fixed direction by the scale signal starts to be observed. That is, the standby state waits for the sinusoidal wave signal as the scale signal Sa which is obtained after traversing the X2 domain shown in FIG. 13.

If the sinusoidal wave signal as the scale signal Sa is obtained, that is if the movement towards the outer rim side is confirmed, measurement of the top and bottom values in each period of the scale signal Sa and storage of these values in the memory 111 are started at step F303. The controller 151 inputs the scale signal Sa, sent from the optical encoder 15 of the scale mechanism 30, as digital signals, and searches for the maximum value (top value) and the minimum value (bottom value) in each period. The top and bottom values, thus detected, are stored in the memory 111 in association with each data track.

This acquisition of the top and bottom values in association with each data track is executed for the totality of the data tracks. If it is confirmed at step F304 that acquisition of the totality of the data tracks, that is 80 tracks, has come to a close, the standby state is set at step F305 for 200 msec.

This time duration of 200 msec is set as being sufficient for the head to reach the outermost mechanical stop position.

By the above-described processing of FIG. 16, the top and bottom values for the totality of data tracks are acquired, whilst the magnetic head element 10 reaches the outermost mechanical stop position.

If, by such processing, the step F104 of FIG. 14 comes to a close, the processing for preparations for operation, that is the processing for the operations ⑤ and ⑥, is performed at step F105.

Figure 17:
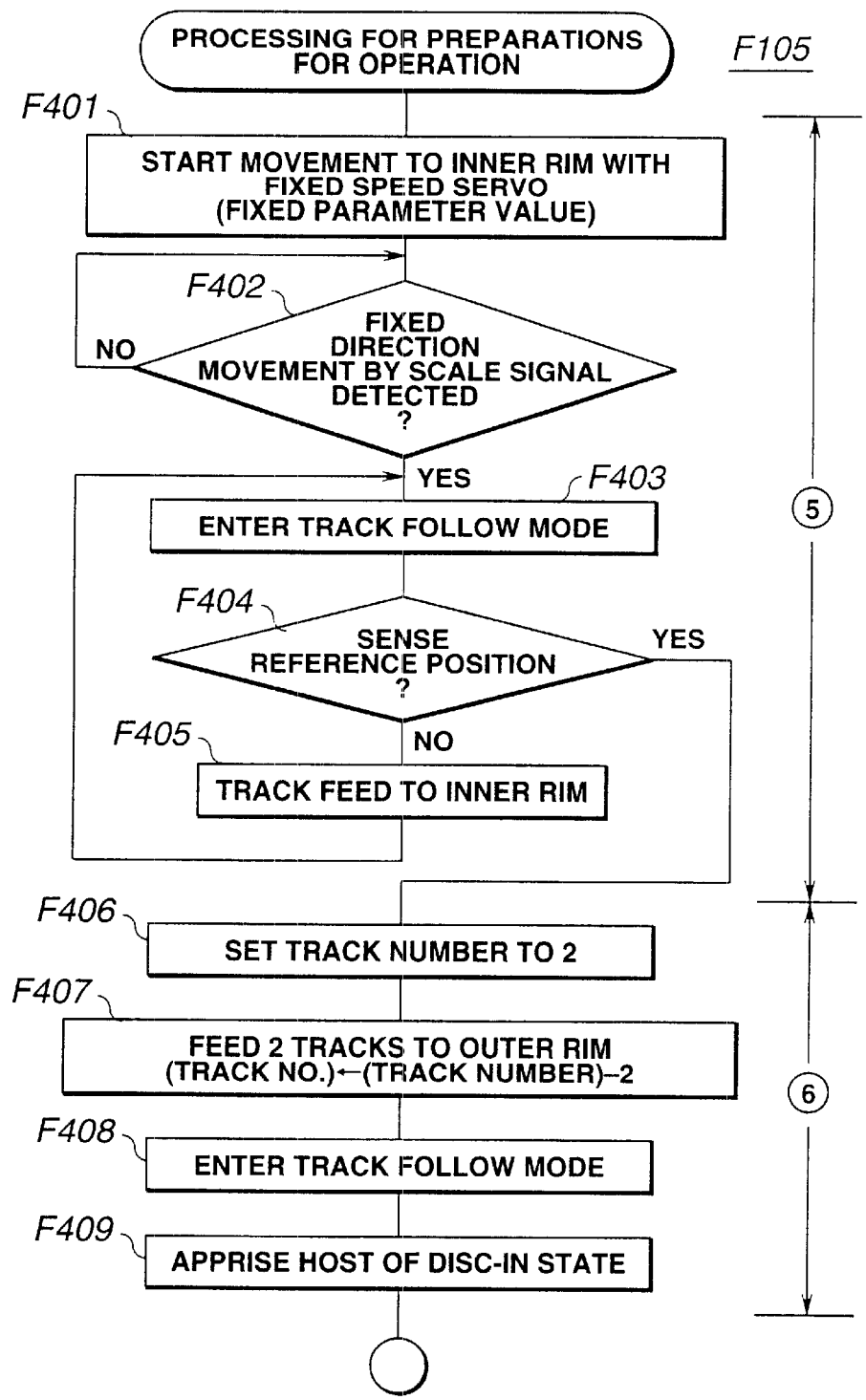
FIG. 17 is a flowchart for the processing for readying for the operation according to an embodiment of the present invention.

This processing is shown in detail in FIG. 17.

First, at step F401, constant speed servo is applied, as the servo parameters are set to fixed values, such as initial values to start the head movement towards the inner rim side.

If the fixed speed movement is started by the constant speed servo control, a standby state is set at step F402 to wait until movement in a fixed direction by the scale signal starts to be observed. That is, the standby state waits for the sinusoidal wave signal as the scale signal Sa which is obtained after traversing the X1 domain shown in FIG. 13.

If the sinusoidal wave signal as the scale signal Sa is obtained, the track follow mode is initiated at step F403 to perform control to set the magnetic head element 10 at the track center of the data track prevailing at the time point.

At step F404, it is checked whether or not the position at the time point is the sense reference position, that is sense reference signal Sb is verified.

If the edge timing of the of the sense reference signal Sb at the prevailing track follow time is not detected, it is assumed that the sense reference position has not been reached, so that processing transfers to step F405 to effect track feed towards the inner rim. That is, the magnetic head element 10 is fed one track towards the inner rim. Then, processing reverts to step F403. It is then checked at step F404 whether or not the head position is the sense reference position.

If is verified at a certain time point that the head position is the sense reference position, the data track on which the head is positioned is found to be a track TK2.

Then processing transfers to step F406 to set the value of the track number indicating the data track at the current time point to "2".

At step F407, the head is moved by two tracks towards the outer rim, whilst the track number is decremented correspondingly to set the track number to 0. If the head movement by two tracks towards the outer rim is completed, the track follow mode is entered at step F408. That is, the magnetic head element 10 is positioned at the track center of the track TK0.

If the magnetic head element 10 is positioned on the track TK0, the preparation operation is assumed to be completed, and disc-in state (the recording/reproducing possible state) is reported to a host computer at step F409 to complete the sequence of operations for disc loading.

In the disc drive device of the preferred embodiment, the servo parameters that can realize the fixed speed servo proper for acquisition of the top and bottom values are calculated based on the scale signal observed as the movement mechanism is moved at a fixed speed by default servo. The servo parameters, thus found, are then used to execute the fixed speed servo for acquisition of the top and bottom values.

Thus, stable optimum fixed speed servo can be realized at all times without being affected by difference from one disc drive device to another, chronological changes or changes in posture of the disc drive device. That is, by calculating the servo parameters and employing the calculated servo parameter values, it becomes possible to improve the amplitude dependency of the scale signals in servo control, thus realizing servo stability. Of course, stable servo operations can be realized even if the disc drive device is mounted in a tilted position.

In this manner, optimum top and bottom values can be acquired, thus assuring accurate track movement control and track follow control in subsequent data recording/reproduction.

The present invention is not limited to the above-described embodiment and may be broadly modified within the scope of the invention.

The drive device may also be dedicated to recording or to reproduction. Moreover, the disc drive device is not limited to that for flexible discs and may also be any other drive device in need of a fixed speed servo.

What is claimed is:

1. A driving device comprising:

head means for recording/reproducing data for a plurality of data tracks of a recording medium;

head driving means for causing movement of said head means in a direction perpendicular to said data tracks on said recording medium;

scale signal generating means for generating a scale signal whose period corresponds to a data track;

storage means for storing top and bottom values in each period of said scale signal associated with each data track as data used for movement control of said head means;

servo parameter calculating means for servo controlling said head driving means using initial servo parameters to cause movement of said head means at a constant speed and for calculating servo parameters for fixed speed movement from top and bottom values of said scale signal measured at the time of constant speed movement of said head means; and movement control data storage control means for servo controlling said head driving means using the servo parameters calculated by said servo parameter calculating means for causing movement of said head means at a fixed speed, said movement control data storage control means measuring the top and bottom values in each period of said scale signals associated with each data track to cause the measured top and bottom values to be stored in said storage means.

2. The drive device according to claim 1 wherein the constant speed movement of said head means is carried out by servo controlling said head driving means with a value corresponding to a difference between a reference speed and a current speed multiplied by a pre-set gain; at least initial values of said gain and the reference speed are pre-set as said initial servo parameters; and wherein at least the value of said gain and said reference speed values are calculated as said servo parameters by said servo parameter calculating means.

3. The drive device according to claim 1 wherein said servo parameter calculating means calculates servo parameters for constant speed movement using amplitude levels of said scale signal calculated from top and bottom values of said scale signal.

4. The drive device according to claim 1 wherein the drive device performs tracking control of said head means based on the top and bottom values stored in said movement control data storage control means.

5. A drive device comprising:

first head means for recording and/or reproducing data for data track of a first disc-shaped recording medium;

second head means for recording and/or reproducing data for data tracks of a second disc-shaped recording medium higher in the recording capacity than said first disc-shaped recording medium;

head driving means for causing movement of said first and second head means in a direction perpendicular to a plurality of the data tracks of said first and second disc-shaped recording mediums, respectively;

recording medium holding means on which said first and second disc-shaped recording mediums are loaded selectively;

discriminating means for discriminating the type of the disc-shaped recording mediums loaded on said recording medium holding means;

detection means for detecting the state of movement of a head responsive to movement of said head means; and control means for controlling said head driving means so that, if said discriminating finds that said first disc-shaped recording medium has been loaded, said head means is moved based on a detection output of said detection means, and so that, if said discriminating finds that said second disc-shaped recording medium has been loaded, said head means is moved based on the servo information recorded on said second disc-shaped recording medium.

6. The drive device according to claim 5 wherein said detection means includes scale signal generating means for generating scale signals responsive to movement of said head means, with each period of said scale signal corresponding to a data track.

7. The drive device according to claim 6 further comprising:

storage means for storing top and bottom values in each period of said scale signal associated with each data track, as data usable for movement control of said head means;

servo parameter calculating means for servo controlling said head driving means, using initial servo parameters, for causing movement of said head means at a fixed speed, and for calculating servo parameters for fixed speed movement for said fixed speed movement from top and bottom values of the scale signal measured during said fixed speed movement; and movement control data storage control means for servo controlling said head driving means, using servo parameters calculated by said servo parameter calculating means, to cause fixed speed movement of said head means, said movement control data storage control means measuring top and bottom values of said scale signal in each period associated with each data track to store the measured top and bottom values in said storage means.

8. The drive device according to claim 7 wherein said fixed speed movement of said head means is effected by servo controlling said head driving means with a value corresponding to a difference between a reference speed and the current speed multiplied with a pre-set gain and wherein at least initial values of said gain and the reference speed are pre-set as said initial servo parameters, at least the values of said gain and the reference speed being calculated by said servo parameter calculating means as said servo parameters.

9. The drive device according to claim 7 wherein said servo parameter calculating means calculates servo parameters for fixed speed movement using amplitude levels of said scale signal as calculated from top and bottom values of said scale signal.

10. The drive device according to claim 7 wherein the device performs tracking control of said head means based on the information stored in said movement control data storage control means.

11. A method for fixed speed movement servo for causing fixed speed movement of head means, adapted for recording/reproducing data for a plurality of data tracks of a recording medium, in a direction perpendicular to said data tracks of said recording medium, by head driving means, comprising:

an initial movement step for servo controlling said head driving means using initial servo parameters for causing movement of said head means at a fixed speed;

a measurement step for monitoring a scale signal, generated responsive to movement of said head means, with each data track as one period, during movement of said head means in accordance with said initial movement step, for measuring top and bottom values of said scale signal;

a calculating step for calculating servo parameters for fixed speed movement, using the top and bottom values as measured in said measurement step; and a fixed speed movement step for servo controlling aid head driving means, using the servo parameters as calculated by said calculating step, to cause movement of said head means at a fixed speed.

12. The method for fixed speed movement servo according to claim 11 wherein the fixed speed movement of said head means in said initial movement step and in said fixed speed movement step is executed by servo controlling said head driving means with a value corresponding to a difference between a reference speed and the current speed multiplied by a predetermined gain; wherein at least initial values of said gain and the reference speed are pre-set as said initial servo parameters; and wherein at least the values of said gain and the reference speed are calculated by said calculating step as said servo parameters.

13. The method for fixed speed movement servo according to claim 11 wherein, in said calculating step, the servo parameters for fixed speed movement are calculated using the amplitude levels of said scale signal as calculated from said top and bottom values.

* * * * *